United States Patent [19]
Dorn

[11] 3,752,604
[45] Aug. 14, 1973

[54] PUMP VALVE ASSEMBLY
[75] Inventor: Chester Dorn, Spencer, Iowa
[73] Assignee: Superior Manufacturing Company, Spencer, Iowa
[22] Filed: July 19, 1971
[21] Appl. No.: 163,633

[52] U.S. Cl. .................................. 417/511, 417/553
[51] Int. Cl. .............................................. F04b 7/04
[58] Field of Search .................. 417/511, 512, 513, 417/550, 552, 553, 548, 523

[56] References Cited
UNITED STATES PATENTS
1,381,224  6/1921  Petricone ........................... 317/511
3,652,188  3/1972  Ochiyama ........................... 417/511
3,319,577  5/1967  Herreshoff .......................... 417/511

Primary Examiner—Carlton R. Croyle
Assistant Examiner—Richard Sher
Attorney—Henderson & Strom

[57] ABSTRACT

A barrel pump valve assembly including a piston slidably carried by a piston rod. An O-ring seal for contacting the pump cylinder wall is supported between the piston and a disc attached to the piston rod, and the O-ring and piston move longitudinally toward and away from the disc to close and open the valve, respectively. When the O-ring is away from the disc, fluid can pass between the disc and O-ring and through openings in the piston, and when the O-ring is in contact with the disc, the valve is closed.

6 Claims, 5 Drawing Figures

Patented Aug. 14, 1973
3,752,604
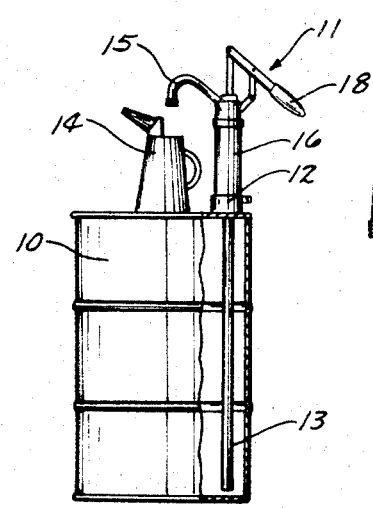
Fig. 1
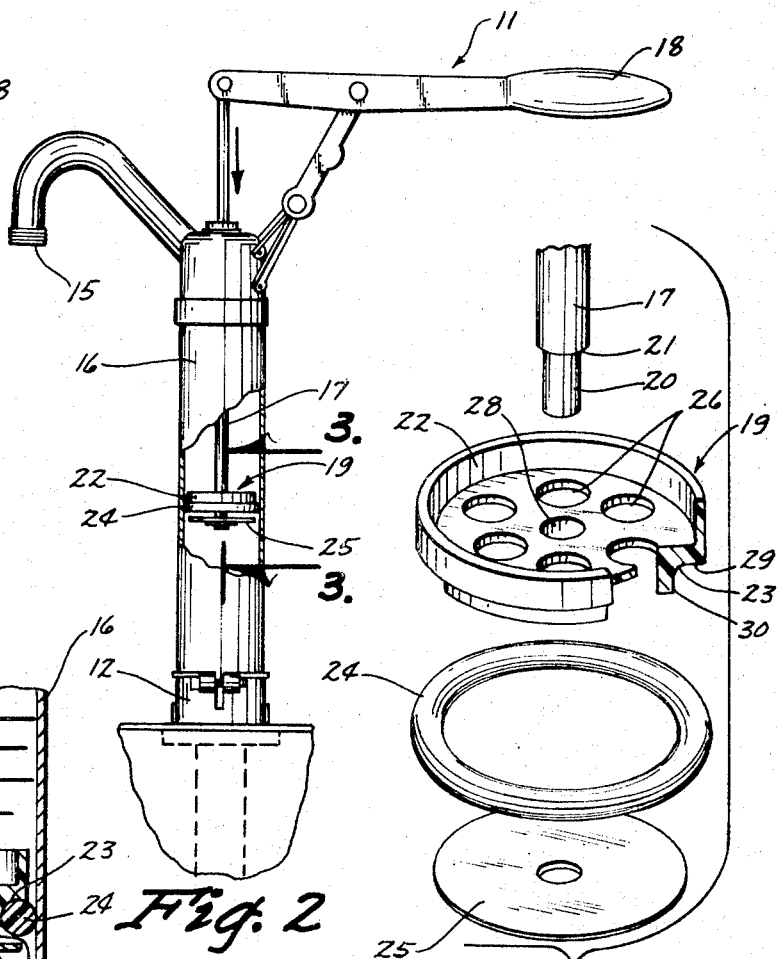
Fig. 2
Fig. 5
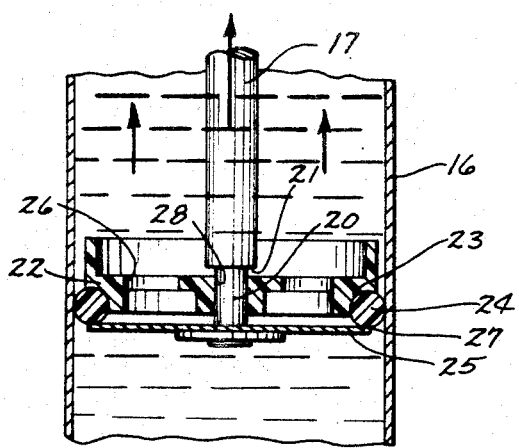
Fig. 3
Fig. 4
INVENTOR
CHESTER DORN
BY Henderson & Strom
ATTORNEYS

PUMP VALVE ASSEMBLY

BACKGROUND OF THE INVENTION

Barrel pumps of the type which attach to a threaded opening or bung in barrel tops have been used for many years. These pumps generally include a telescoping suction tube which allows for use with different sizes of barrels or drums, and include two check valves and an operating handle attached to a plunger or piston rod. U. S. Pat. No. 3,473,479 illustrates a typical arrangement of a barrel pump and its operation.

Typically, such pumps have a piston attached to the piston rod in sealing relation to the pump cylinder, and a floating disc alternately covers and uncovers openings in the piston as the lever is actuated, all as shown in the above-noted patent.

Numerous other types of check valves have been tried in the past, such as flap valves, and the O-ring and floating disc arrangements as described in U. S. Pat. No. 2,678,006.

All of these prior art valves are serviceable to varying degrees, but prior to the present invention, a true O-ring seal was not available for a barrel pump valve. For example, the valve shown in FIGS. 8 and 9 of U. S. Pat. No. 2,678,006 does not provide an O-ring seal between the two chambers in the pump cylinder, even though an O-ring is shown contacting the cylinder wall. The actual seal is still a metal-to-metal seal as shown therein, and is subject to leakage due to corrosion or distortion of one of the metal surfaces, or from particles lodging between the two hard surfaces. Thus, while the piston and cylinder wall are sealed by the O-ring, the valve itself relies on a metal-to-metal seal.

A moving O-ring seal for a double-acting pump is illustrated in U. S. Pat. No. 3,485,180.

There has long been a need for a simple, inexpensive, yet reliable and effective, valve for a pump of the barrel pump type.

SUMMARY OF THE INVENTION

The invention relates to a pump valve assembly, and more particularly to a pump valve assembly of the type for use with a barrel pump.

According to this invention, a pump valve assembly is provided which includes a piston attached to a piston rod which reciprocates within a cylinder. The valve alternately opens and closes to effect pumping of fluid through an outlet. A floating piston carried by the piston rod causes a sealing means such as an O-ring to move into and out of engagement with a disc fixed to the piston rod. When the sealing means is in engagement with the disc, no fluid flows through the valve assembly, and when the sealing means is out of engagement with the disc, fluid can pass between the disc and sealing means and then up through openings in the piston. It will be seen that sealing means other than O-rings might be used in the invention, although O-rings are much preferred.

It is an object of this invention to provide an improved pump valve assembly.

It is a further object to provide a pump valve assembly in which a seal is accomplished without any metal-to-metal contact at the sealing surfaces.

BRIEF DESCRIPTION OF THE DRAWINGS

FIG. 1 is a side elevation, partially cut away, illustrating an example of the equipment with which the valve assembly of this invention is useful.

FIG. 2 is a side elevation, partially cut away, illustrating the pump valve assembly of this invention as used with a barrel pump.

FIG. 3 is a fragmentary elevational sectional view of a pump valve assembly illustrating the operation thereof during a downward stroke.

FIG. 4 is a fragmentary elevational sectional view of a pump valve assembly illustrating the operation thereof during an upward stroke.

FIG. 5 is an exploded perspective view of the parts constituting a pump valve assembly in accordance with this invention.

DESCRIPTION OF THE PREFERRED EMBODIMENT

The preferred embodiment of the invention will now be described by reference to the several figures of the drawings.

FIG. 1 illustrates a typical arrangement of a barrel or drum 10 having a pump 11 mounted thereon by clamp 12. A suction tube 13 extends to the lower portion of the interior of the barrel 10, and connects to the pump inlet in a conventional manner. A container 14 is shown for receiving fluid from the outlet 15 of pump 11.

As shown more clearly in FIG. 2, pump 11 includes an elongated cylinder 16, a plunger or piston rod 17, and an actuating linkage including a handle 18. The pump 11 is mounted on the barrel 10 in any suitable manner, such as by clamp 12, and includes a lower check valve (not shown) which opens during upward travel of piston rod 17 and closes during downward travel of piston rod 17 in a conventional manner.

The preferred pump valve assembly of this invention is illustrated generally at 19, and constitutes the upper check valve of the barrel pump 11. The pump valve assembly 19 reciprocates within the cylinder 16 in response to operation of the pump handle 18.

The pump valve assembly and its operation are illustrated in detail in FIGS. 3 and 4, wherein piston rod 17 is shown having a section 20 of reduced diameter and a shoulder 21 (FIG. 4) at the juncture of section 20 and rod 17. A floating piston 22 is slidably carried by section 20 of rod 17, and is of slightly less diameter than the interior of the cylinder 16. The piston 22 has an annular groove 23 about its lower periphery, and receives an O-ring 24 formed of suitable resilient material therein. The O-ring 24 extends outward of the piston 22 and contacts the inner wall of cylinder 16, preventing fluid passage between the O-ring 24 and the wall of cylinder 16. A rigid disc 25 is fixed to the lower end of the reduced section 20 of rod 17, and it can be seen (FIGS. 3 and 4) that piston 22 can move longitudinally relative to disc 25 by sliding along reduced section 20 of rod 17. The disc 25 is impervious to fluid flow, but does not extend to the wall of cylinder 16, thus allowing flow of fluid around the disc and up through openings 26 in piston 22 during downward movement of piston rod 17 as indicated by the arrows in FIG. 3.

During the upward or pumping stroke of rod 17, the reduced section 20 of rod 17 will move up through piston 22 until O-ring 24 contacts disc 25. Thereafter, as the rod 17 continues upward, the piston 22 will travel with the rod and disc and will form a seal at 27. It will be noted that in this condition an O-ring seal is effected both between O-ring 24 and cylinder 16, and between O-ring 24 and disc 25. This invention thus does away with the inferior metal-to-metal contacts of previous pump valve assemblies.

The elements of the pump valve assembly of this invention are best illustrated, according to the preferred embodiment, in the perspective view of FIG. 5. Piston Rod 17 and reduced section 20 thereof are shown, and a shoulder 21 is formed at their juncture. Piston 22 is shown with a central opening 28 which slides along reduced section 20 of rod 17. A series of openings 26 are formed in piston 22 to allow flow of fluid therethrough, and an annular groove 23 is formed about the outer periphery and includes a top seal supporting surface 29 and a side seal supporting surface 30 for retaining a sealing means (shown in FIG. 5 as an O-ring 24) and supporting it in sealing contact with a cylinder wall. A disc 25 is shown below O-ring 24, and in use is fixed to the lower end of reduced section 20 to contact O-ring 24 during the upward stroke of piston rod 17. The piston 22 can be formed from any material compatible with its intended use. A molded polymeric material such as a rigid polyethylene is adequate for most purposes. While the piston does not actually contact the wall of the cylinder, nevertheless it acts as a centering device due to its support of the O-ring 24 which does contact the cylinder wall.

OPERATION

The operation of the pump valve assembly of this invention will be described by reference to FIGS. 2, 3, and 4.

When the pump handle 18 (FIG. 2) is moved downward, the piston rod 17 moves up, and the pump valve assembly assumes the configuration shown in FIG. 4. It will be seen that piston 22, due to frictional contact with the cylinder 16, does not move upward with the initial upward movement of the piston rod 17, but instead the reduced section 20 slides upward through central opening 28 until the disc 25 contacts O-ring 24. At this point, the piston 22 travels upwardly with the piston rod 17 and disc 25 until the upward travel of piston rod 17 is completed. During this upward movement, it will be seen that fluid-tight relationship is maintained at 27 between the portions of the cylinder interior above and below piston 22 due to the sealing action of O-ring 24 against cylinder 16 and disc 25. This results in a suction of fluid from the barrel 10 through suction tube 13 (FIG. 1) into the cylinder 16 below piston 22. The same stroke also results in lifting fluid from cylinder 16 above piston 22 out through outlet 15 (FIG. 2). A check valve (not shown) in the lower part of cylinder 16 allows fluid from suction tube 13 to enter cylinder 16 during the upstroke of piston 22.

When the handle 18 is moved upward, the piston rod begins to move downward and the check valve (not shown) in the lower part of cylinder 16 closes, thus retaining in cylinder 16 all the fluid which was lifted up during the upstroke of piston 22.

As the piston rod 17 starts downward, reduced section 20 slides through opening 28 in piston 22 until piston 22 contacts shoulder 21 on piston rod 17. This results in an opening between O-ring 24 and disc 25 (FIG. 3) which allows fluid from cylinder 16 below piston 22 to pass therethrough and up through openings 26 in piston 22 so that the next upstroke of piston 22 will lift it out through outlet 15.

Continued operation of handle 18 repeats the above cycle until the desired amount of fluid has been pumped from barrel 10 out through outlet 15 of pump 11.

The present invention thus provides a pump valve assembly which operates without any metal-to-metal seal, resulting in more efficient and more reliable operation.

The above detailed description of the preferred embodiment of the invention is for the purpose of illustration, and it is to be understood that various modifications and variations may be made without departing from the actual scope of the invention, which is defined in the appended claims.

I claim:

1. A pump valve assembly of the type for use in a pump having an elongated cylinder including:
   a piston rod;
   a piston adapted for limited sliding movement relative to the piston rod near one end of the piston rod, said piston having an opening therethrough for passage of fluid and having a recessed groove about its periphery for receiving a sealing means;
   a disc attached to the piston rod below the piston; and
   an annular sealing means in said groove in the piston; said annular sealing means being adapted to contact the disc and to prevent flow of fluid through the valve assembly during movement of the piston rod in a first direction and said sealing means being adapted to move away from said disc during movement of the piston rod in a second direction, thereby allowing fluid to flow between the disc and the sealing means and through the opening in the piston.

2. The pump valve assembly of claim 1 wherein the annular sealing means is an O-ring formed of a resilient material.

3. The pump valve assembly of claim 2 wherein the recessed groove in the piston supports the O-ring against inward movement.

4. The pump valve assembly of claim 3 wherein the piston rod has a section of reduced diameter and the piston is slidably carried on said section of reduced diameter.

5. The pump valve assembly of claim 4 wherein the sliding movement of the piston on the section of the piston rod having a reduced diameter is limited in one direction by a shoulder formed at the juncture of the piston rod and the section of the piston rod having a reduced diameter.

6. The pump valve assembly of claim 5 wherein the piston has a plurality of openings adapted to allow passage of fluid therethrough.

* * * * *